Aug. 29, 1933.  F. G. MARCIANO  1,924,951
EYEGLASS FRAME
Filed Dec. 26, 1929  3 Sheets-Sheet 1
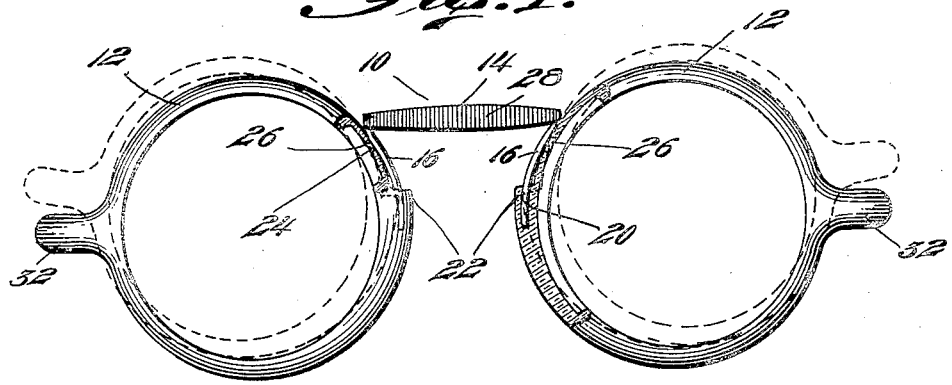
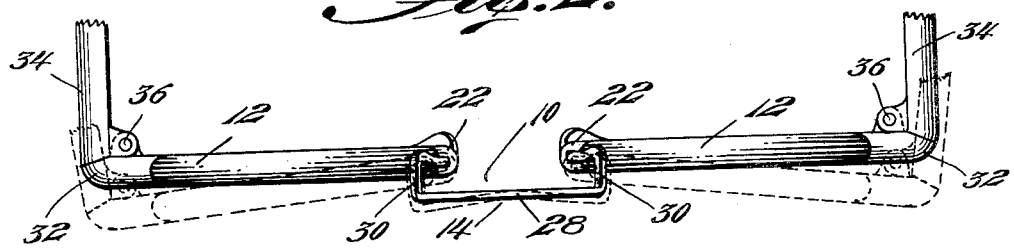
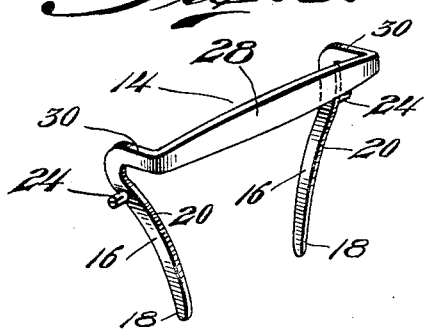
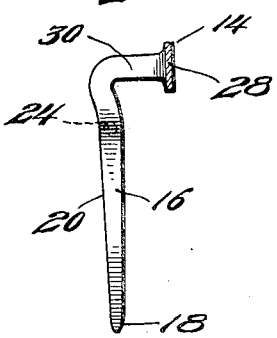
Inventor
Frank G. Marciano
By Thomas A. Jenks Jr.
Attorney Aug. 29, 1933.                F. G. MARCIANO                1,924,951
                               EYEGLASS FRAME
                           Filed Dec. 26, 1929            3 Sheets-Sheet 3
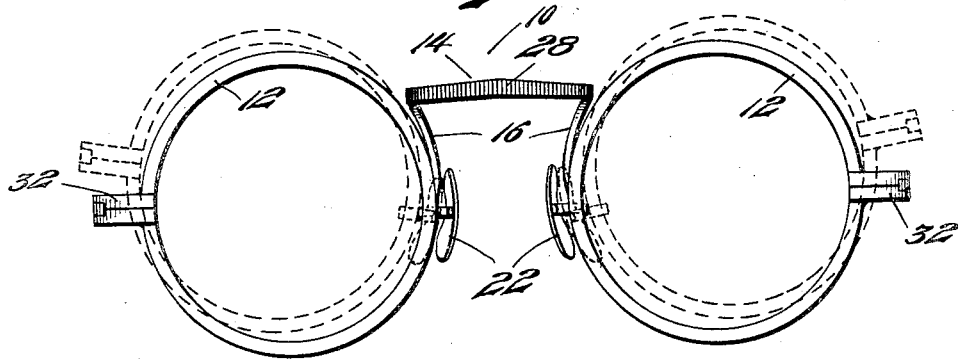
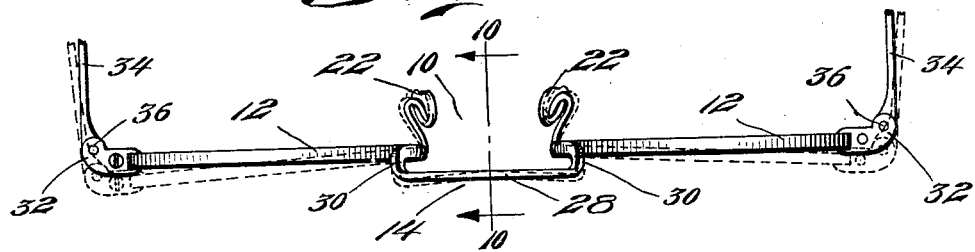
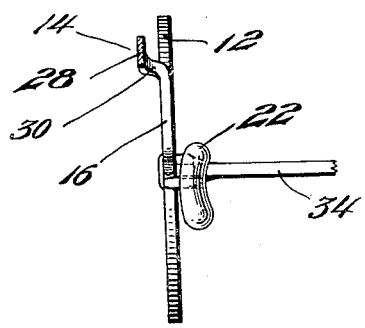
Inventor
Frank G. Marciano
By Thomas A. Jenkins Jr.
Attorney Patented Aug. 29, 1933

1,924,951

UNITED STATES PATENT OFFICE 1,924,951

EYEGLASS FRAME

Frank G. Marciano, Providence, R. I., assignor to Universal Optical Corporation, Providence, R. I., a corporation of Rhode Island Application December 26, 1929
Serial No. 416,603

3 Claims. (Cl. 88—45)

My invention relates to bridge members adapted to be used on eye glasses per se or preferably with the addition of temples attached to the edges of the lenses as spectacles. The advantages of eye glasses over spectacles are well known, namely, that the eye glasses are provided with nose gripping members which firmly attach the eye glasses to the nose at the desired focal distance from the eyes. The advantages of spectacles are additionally well known, namely, that they hold the glasses on the nose without gripping or pinching the nose. On the other hand, however, spectacles are not so apt to hold the glasses on the nose at the desired focal distance from the eyes.

An object of my invention therefore is to provide a resilient spring bridge member, preferably constructed of a single piece of resilient metal adapted to lightly grip the nose while permitting the temples attached to the ends of the frame to additionally bind the eye glass frame to the nose in the desired position, thereby combining the best features of spectacles and eye glasses. It is also well known that certain noses are so shaped that they can not wear eye glasses.

A further feature of my invention therefore due to the fact that the metallic bridge member may be bent in a horizontal plane to any desired position and resiliently returned to said set position is to provide an eye glass frame which may be sold to all classes of people in which if desired it to be used as spectacles the bridge member may be bent so far apart as only lightly rest on the nose and if it is desired to be used as eye glasses said bridge member may be bent to firmly grip the nose the temples affording additional support to the rims.

A further object of my invention is to provide an eye glass frame of a pleasing design and appearance, preferably one having composition rims and a light metallic bridge member rigidly embedded into said rims of a different color than the rims and having a front frame portion which may be ornamented in any desired fashion.

A further feature of a modified form of my invention is to provide a combination metallic bridge member also having integral retaining nose gripping projections.

A further feature of another modified form of my invention is to provide all metallic spectacle frames having a resilient metallic bridge member attached to the metallic rims. In all embodiments of my invention the bridge member is attached to the rims above the median line thereof so as not to interfere with the vision.

A further feature of my invention is to provide a bridge which may be resilient in a horizontal plane.

These and such other objects of my invention as may hereinafter appear will be best understood from a description of the accompanying drawings which illustrate an embodiment thereof.

In the drawings, Fig. 1 is a front elevation of an eye glass frame having a bridge member constructed in accordance with the teachings of my invention.

Fig. 2 is a plan view thereof with temples pivotally attached to each end of the rims showing how the metallic bridge member and attached rims may be bent to resiliently move the rims in a horizontal plane for different desired nose gripping or nose removal positions.

Fig. 3 is a perspective view of the thin metallic bridge member I preferably employ.

Fig. 4 is a sectional view of the bridge member.

Figure 5:
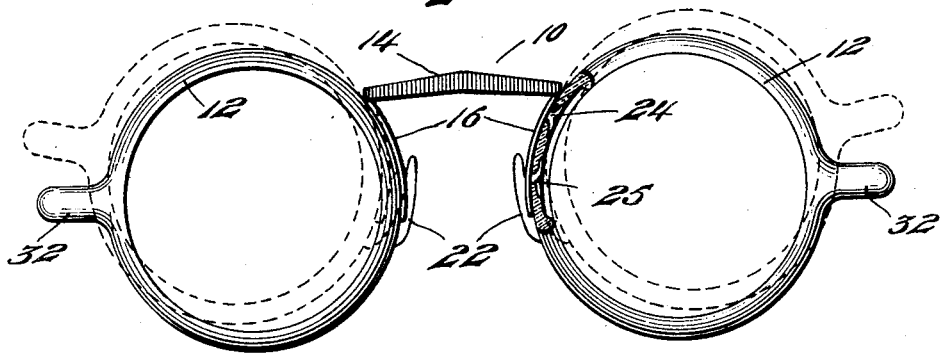

Fig. 5, similar to Fig. 1 is a front elevation partially shown in section of a different embodiment of my invention with the bridge integral with the metal guard embedded into the composition rims.

Figure 6:
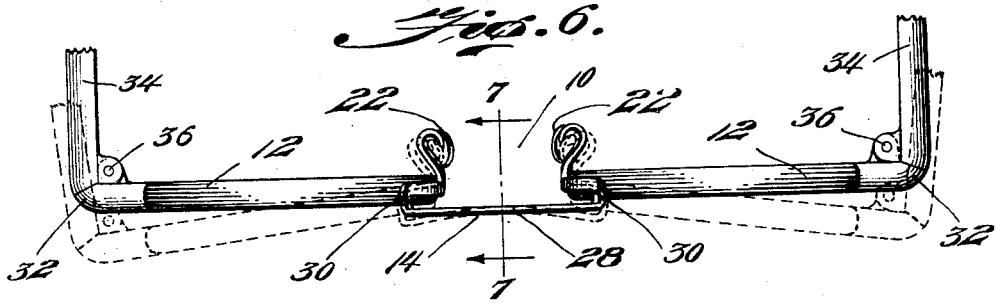

Fig. 6 is a plan view, similar to Fig. 2 of the embodiment shown in Fig. 5.

Figure 7:
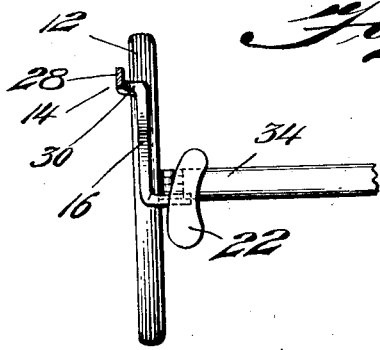

Fig. 7 is a sectional view thereof taken along the line 7—7 of Fig. 6.

Fig. 8 is a front elevation similar to Fig. 1 of a further embodiment of my invention having metal rims.

Fig. 9 is a plan view thereof.

Fig. 10 is a sectional view taken along the line 10—10 of Fig. 9.

In the drawings, wherein like characters of reference indicate like parts throughout, 10 generally indicates an eye glass frame constructed in accordance with the teachings of my invention.

While any type of eye glass holding rims may be employed I preferably employ as in the embodiments shown in Figs. 1–7 eye glass holding rims 12 made out of a composition material. I employ the word "composition" broadly to include all types of shell, celluloid, phenol condensation products and other similar composition products. I also provide a thin metallic bridge member 14 having the ends 16 thereof attached to said rims 12. Said bridge member 14 is preferably adjustable to different set positions and is preferably shaped to cause the rims 12 to grip the nose to hold the glasses contained within said rims 12 at the proper focal distance from the eyes. In the embodiment shown in Figs. 1–4 the bridge member consists of a single sheet of thin spring metal having the lower ends 18 of the downwardly projecting portions 20 thereof embedded into the nose engaging enlargements 22 of the composition rims 12 and also additionally has the projections 24 near the top of the downwardly projecting portions 20 thereof additionally embedded into said composition rims 12 and has the projections split and or upset as at 26 to firmly bind said bridge member to said composition rims 12 at a plurality of points. The center portion 28 of said bridge member is preferably U-shaped and has the ends or U-walls 30 thereof joining the top of said end portions 20 together projecting rearwardly therefrom as shown in Fig. 2. The U-walls 30 thereof as well as the center portion 28 thereof are resilient to permit relative movement between the rims for nose gripping purposes. The rims 12 are preferably provided with the projections 32 at their ends to which the temples 34 may be pivotally attached by means of the pivot pins 36. As the bridge member 14 is resilient both in the center portion 28 thereof, it is obvious that the rims and the entire frame may be bent to the dotted line positions shown in Figs. 1 and 2 either for purposes of adjustment or for nose gripping purposes. The bridge member is preferably constructed of such a material that it may be set in different set positions and resiliently return to said positions when desired. For instance as suggested in Figs. 1 and 2 the bridge member 14 may be so bent that the nose gripping projections 22 on the rims 12 will be spaced sufficiently apart to grip any desired type of nose and resiliently return to its respective nose gripping position in a horizontal plane for removal or other purposes. In addition as stated if it is desired to employ the frame entirely as spectacles the bridge member may be so bent that the nose gripping projections 22 will be so far apart as to only lightly rest on the nose.

I have shown in Figs. 5–7 a slightly modified form of my invention wherein the bridge member is formed integral with the metallic nose gripping projections 22, and the integral projections 22 attached to the composition frame by the projections 24 and 25.

I have shown in Figs. 8–10 a still further embodiment of my invention wherein the rims 12 are metallic, the bridge member is directly soldered thereto and the nose gripping projections 22 are either integral therewith as shown in the embodiment shown in Figs. 5–7 or are separately soldered to the rims 12.

In all embodiments of my invention the bridge is attached to the rims above the median point of the rims thereby raising the point of attachment of the bridge member out of the way so that it will not interfere with the normal use of the eye glasses or spectacles in reading. It is thus apparent that I have provided a novel eye glass frame of pleasing appearance having both the advantages of eye glasses and spectacles.

It is understood that my invention is not limited to the specific embodiments shown and that various deviations may be made therefrom without departing from the spirit and scope of the appended claims.

What I claim is:

1. In combination, composition lens rims having enlarged nose gripping projections on the inner surface thereof, a bridge member consisting of a single integral sheet of relatively thin substantially flat resilient metal bent into legs comprising end portions projecting downwardly substantially parallel to the inner rim edges and adapted to have the outer sides thereof attached to each lens rim and portions projecting forwardly from the upper ends thereof in a plane substantially at right angles thereto, whereby on movement of said rims in a vertical plane said leg portions may be bent to a set position and a flat top portion joining the ends of said legs together in a plane at right angles to the ends thereof and parallel to the horizontal plane of said lens rims, whereby on movement of said rims in a horizontal plane away from their points of attachment to said bridge said top portion including the points of jointure thereof may be bent to a set position on a protracted movement thereof or for adjustment to resiliently return to its original set position on a short movement thereof, said bridge member having projections projecting outwardly from the upper ends of the side walls thereof embedded within adjacent portions of said rims and the lower ends of the legs thereof embedded within the nose gripping projections of the composition rims.

2. In combination, composition lens rims, a bridge member consisting of a single integral sheet of relatively thin substantially flat resilient metal bent into legs comprising end portions projecting downwardly substantially parallel to the inner rim edges and adapted to have the outer sides thereof attached to each lens rim and portions projecting forwardly from the upper ends thereof in a plane substantially at right angles thereto, whereby on movement of said rims in a vertical plane said leg portions may be bent to a set position and a flat top portion joining the ends of said legs together in a plane at right angles to the ends thereof and parallel to the horizontal plane of said lens rims, whereby on movement of said rims in a horizontal plane away from their points of attachment to said bridge said top portion including the points of jointure thereof may be bent to a set position on a protracted movement thereof or for adjustment to resiliently return to its original set position on a short movement thereof, said bridge member having two pointed portions on each leg thereof embedded into said rims.

3. In combination with lens rims, a bridge member consisting of a single integral sheet of relatively thin substantially flat resilient metal bent into legs comprising end portions projecting downwardly substantially parallel to the inner rim edges and adapted to have the outer sides thereof attached to each lens rim and portions projecting forwardly from the upper ends thereof in a plane substantially at right angles thereto, whereby on movement of said rims in a vertical plane said leg portions may be bent to a set position and a flat top portion joining the ends of said legs together in a plane at right angles to the ends thereof and parallel to the horizontal plane of said lens rims, whereby on movement of said rims in a horizontal plane away from their points of attachment to said bridge said top portion including the points of jointure thereof may be bent to a set position on a protracted movement thereof or for adjustment to resiliently return to its original set position on a short movement thereof, said bridge member having two points of attachment to said rims on each side wall thereof.

FRANK G. MARCIANO.